June 23, 1953 — A. S. TUCKER — 2,642,710
POWERED ROTARY RAKE
Filed March 2, 1951 — 2 Sheets-Sheet 1

INVENTOR.
Artie S. Tucker
BY Hamilton & Hamilton
Attorneys

June 23, 1953 — A. S. TUCKER — 2,642,710
POWERED ROTARY RAKE
Filed March 2, 1951 — 2 Sheets-Sheet 2

INVENTOR.
Artie S. Tucker
BY Hamilton & Hamilton
Attorneys.

Patented June 23, 1953

2,642,710

UNITED STATES PATENT OFFICE 2,642,710

POWERED ROTARY RAKE

Artie S. Tucker, Independence, Mo.

Application March 2, 1951, Serial No. 213,555

4 Claims. (Cl. 56—27)

This invention relates to new and useful improvements in rakes and has particular reference to rakes of the rotary type.

The principal object of the present invention is the provision of a rotary rake which utilizes fan blades in connection with the rake teeth for blowing leaves, grass, twigs, or other light debris picked up by the teeth into a special receptacle provided therefor.

Another object is the provision, in a rake of the class described, of a scoop carried immediately behind the rake and blower member and adapted to direct the debris into the receptacle, said scoop being vertically movable whereby to pass over irregularities or obstructions on the surface of the ground.

A further object is the provision, in a rake of the class described, of rake teeth which are yieldably mounted so as not to be damaged by contact with the ground or other obstructions.

A still further object is the provision, in a rake of the class described, of a debris-receiving receptacle adapted to retain debris while permitting the escape of air, and which may be quickly and easily emptied.

Other objects are simplicity and economy of construction, efficiency and dependability of operation, and adaptability for use wherever a high capacity rake for leaves, twigs, grass, or other light material is desired.

With these objects in view, as well as other objects which will appear in the course of the specification, reference will be had to the drawing, wherein.

Figure 1:
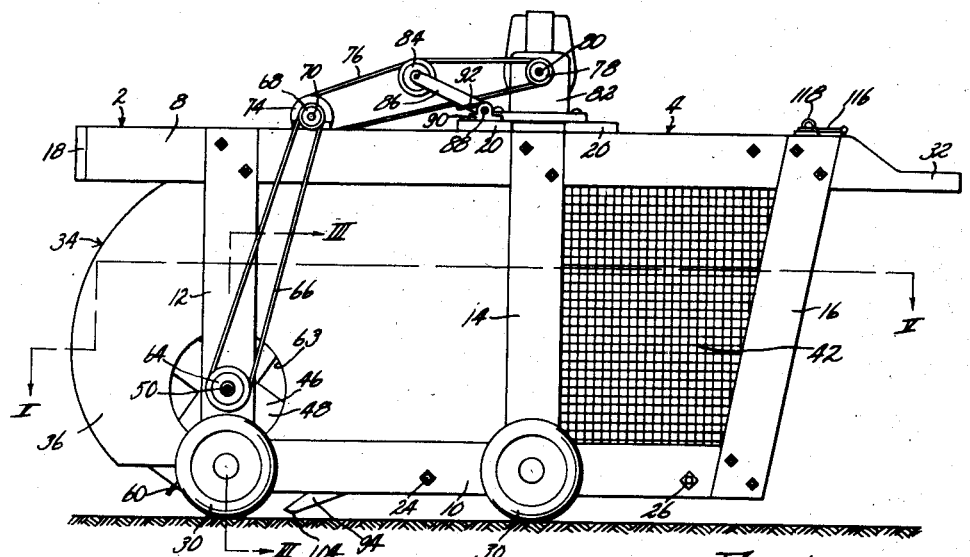
Fig. 1 is a side elevation of a rotary rake embodying my invention.
Figure 2:
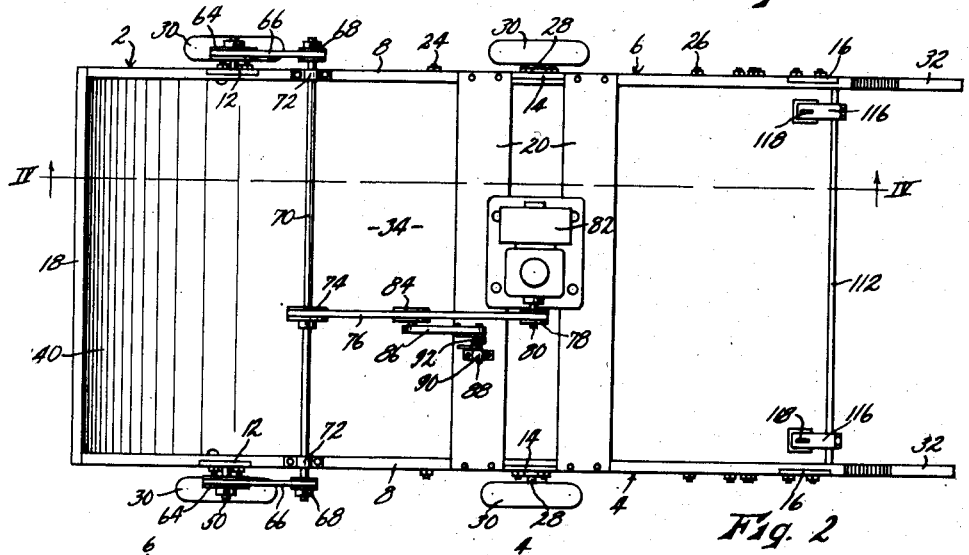
Fig. 2 is a plan view of the rake as shown in Fig. 1.

Like reference numerals apply to similar parts throughout the several views, and the numeral 2 applies to a frame including a pair of spaced apart parallel side frames 4 and 6. Each of said side frames comprises a horizontal top rail 8 and bottom rail 10 rigidly connected by a front vertical bar, an intermediate vertical bar 14, and a rearward vertically extending bar 16. The top rails 8 of the side frames are rigidly connected by a front transverse bar 18, a pair of intermediate transverse bars 20, and a rearward transverse bar 22. Lower rails 10 of the side frames are rigidly interconnected by transversely extending tie rods 24 and 26. Carried by each lower rail 10 respectively at the lower ends of vertical bars 12 and 14, are two outwardly extending stub axles 28, on each of which is rotatively mounted a ground engaging wheel 30, whereby the frame is supported for movement over the ground. Top rails 8 are extended rearwardly to form handles 32 whereby the device may be manually propelled.

Carried within frame 2 is a sheet metal housing 34 comprising side walls 36 and 38 and top wall 40. Said side walls are fixed respectively to the inner surfaces or side frames 4 and 6, and extend from the forward end of the frame to the intermediate vertical frame members 14. The apertures in each of said side frames bounded by rails 8 and 10 and vertically extending members 14 and 16 are covered with an open wire screen 42, for a purpose hereinafter appearing. Top wall 40 of housing 34 extends rearwardly to rearward transverse frame member 22. At its forward end, said top wall is curved downwardly in a substantial scroll shape, as indicated at 44 in Fig. 4, terminating at the front lower edge of the device.

Figure 3:
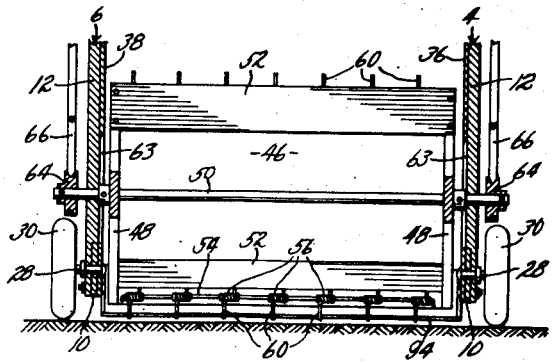
Fig. 3 is a fragmentary section taken on line III—III of Fig. 1, with the reel left partially in elevation.
Figure 4:
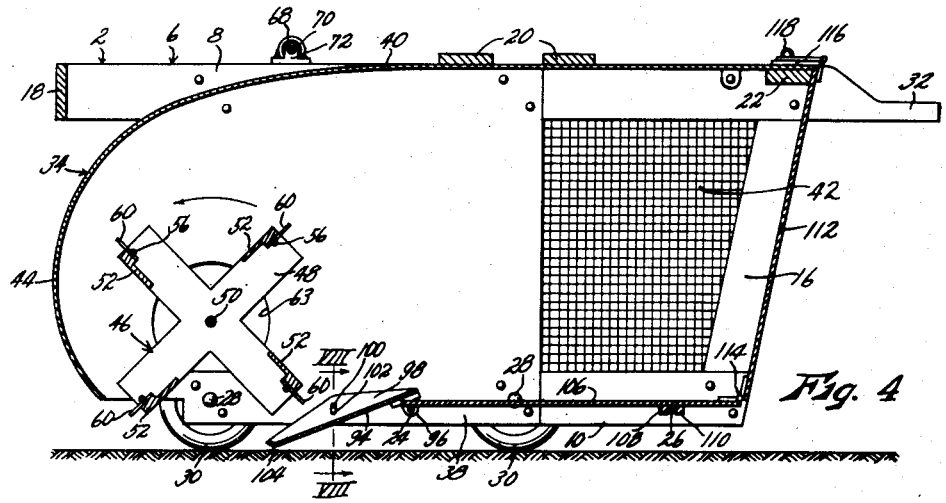
Fig. 4 is a sectional view taken on line IV—IV of Fig. 2.
Figure 5:
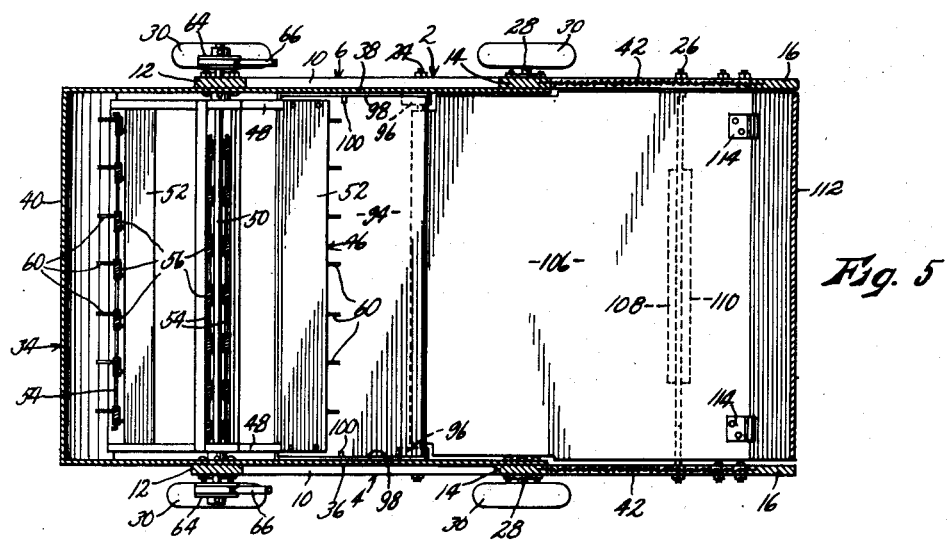
Fig. 5 is a sectional view taken on line V—V of Fig. 1.

A reel 46 is carried in the lower forward portion of housing 34 for rotation on a transverse horizontal axis. As best shown in Figs. 3, 4, and 5, said reel comprises a pair of cross-shaped end members 48 fixed on shaft 50, and a plurality of peripherally spaced blades 52 extending parallel to shaft 50 and fixed to said end members. Said blades are sufficiently broad, in a direction radial to shaft 50, to act effectively as fan blades for directing a current of air rearwardly and upwardly into housing 34 when the reel is rotated in the direction of the arrow in Fig. 4.

Figures 6, 7:
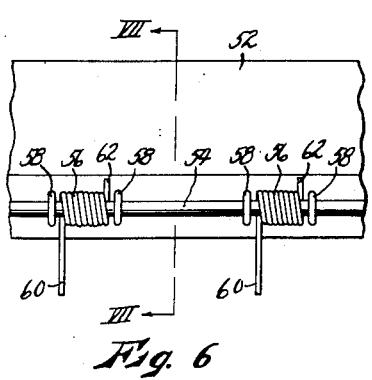
Fig. 6 is an enlarged fragmentary fore view of one of the reel blades, showing the mounting of the rake teeth thereon.
Fig. 7 is a sectional view taken on line VII—VII of Fig. 6.

Mounted on the rearward or trailing force of each blade is a rod 54 extending parallel to shaft 50 and disposed adjacent the outer edge of the blade. Carried on said rod in longitudinally spaced relation therealong are a plurality of helical springs 56. Said rod is secured to the blade, and the springs positioned on said rod, by an eye 58 screwed into the blade adjacent each end of each spring 56 and receiving rod 54 therethrough, as best shown in Figs. 6 and 7. One end portion of each spring is straightened and extends outwardly beyond the edge of the associated blade to form a rake tooth 60. The other end portion 62 of each spring is straightened and lies against the face of the blade to prevent rotation of the spring on rod 54. In Fig. 5 it will be noted that the teeth 60 on successive blades are staggered longitudinally of the reel, in order to provide a more thorough coverage of the ground.

Shaft 50, which carries reel 46, is journalled in the forward vertical frame members 12, as shown in Fig. 3, at such an elevation that the ends of teeth 60 normally are spaced slightly above the ground. Side walls 36 and 38 each have an aperture 63 formed therethrough concentrically with shaft 50, said apertures forming air inlets for the reel. The ends of shaft 50 are extended outwardly from the frame, and a pulley 64 is fixed on each extended end portion thereof. Each of said pulleys is operatively connected by a belt 66 with a pulley 68 fixed on shaft 70. Shaft 70 extends transversely above frame 2, being carried rotatively in bearings 72 mounted on top rails 8 of the frame. A pulley 74 is fixed on intermediate portion of shaft 70, and is operatively interconnected by a belt 66 with a pulley 68 fixed on shaft 70. Shaft 70 extends transversely above frame 2, being carried rotatively in bearings 72 mounted on top rails 8 of the frame. A pulley 74 is fixed on an intermediate portion of shaft 70, and is operatively interconnected by means of belt 76 with a pulley 78 mounted on the drive shaft 80 of a gasoline motor 82 or other suitable power unit which is carried by intermediate transverse frame members 20. Belt 76 is maintained taut by an idler pulley 84 carried rotatively at the free end of an arm 86. Said arm extends transversely to the axis of pulley 84, and is pivoted at its opposite end on a pin 88 parallel to the axis of pulley 84 and mounted on a frame member 20 by means of bracket 90. Arm 86 is urged pivotally upwardly to tighten belt 76 by means of a spring 92 carried on pin 88.

Figure 8:
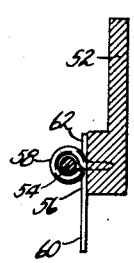
Fig. 8 is an enlarged, foreshortened, fragmentary sectional view taken on line VIII—VIII of Fig. 4.

A generally planar scoop 94 extends transversely between housing side walls 36 and 38 just to the rear of reel 46. The forward edge of said scoop lies outside the lower portion of the orbit of reel 46. The scoop slopes upwardly and rearwardly, and is pivotally mounted at its rearward edge on tie rod 24 by means of bearing members 96 fixed to the under side of said scoop. Said bearing members support the rearward edge of the scoop substantially above tie rod 24. At each end scoop 94 is provided with an upturned ear 98 which is disposed in sliding contact with the associated side wall of housing 34. A pin 100 is fixed in each of said side walls and extends inwardly through a vertically elongated slot 102, as best shown in Fig. 8. Thus the scoop normally rides in very closely spaced relation above the ground, and directs the air and raked material upwardly into the housing. At the same time it may be deflected upwardly by contact with irregularities or obstructions on the ground. The leading edge portion of the scoop is curved slightly upwardly as indicated at 104 in order to prevent it from digging into the ground.

A floor member 106 rests freely in a horizontal position on the rods 24 and 26, the forward edge portion thereof extending beneath the rearward edge portion of scoop 94 and the rearward edge thereof extending substantially flush with the rearward end of frame 2. A pair of cleats 108 and 110 are fixed to the underside of said floor and are disposed respectively to the front and rear of tie rod 26, thereby preventing forward or rearward movement of the floor. A back wall 112 is pivoted at its lower edge to the rearward edge of floor 106 by hinges 114. At its upper edge, said back wall is provided with a pair of hasps 116 adapted to engage releasably staple members 118 mounted on the upper surface of top wall 40 of housing 34.

The operation of the rake is substantially as follows: When reel 46 is set in rotation by motor 82, and the rake moved over the ground, teeth 60 pick up leaves, grass, twigs, and other light material, and the centrifugal force caused by the rotation of the reel, assisted by the substantial air current generated by blades 52 of the reel, throws the material rearwardly and upwardly into the housing. Scoop 94 prevents the material from being blown under the floor. The air escapes from the housing through screens 42, but the screens are of sufficiently fine mesh to trap the raked material therein. The front wheels 30 are disposed in the vertical plane of the reel axis, and hence normally hold the rake teeth 60 properly in closely spaced relation above the ground, since the reel is thereby caused to follow the contour of the ground quite closely. However, if the teeth should strike irregularities of the ground, or other obstructions, they are resiliently deflected due to their yieldable mounting so as to pass over the obstruction, without damage. The scoop 94 is likewise deflected pivotally upwardly by obstructions or ground irregularities, as previously described. The pivotal movement of the scoop is limited by pins 100 so that in no event can it move into the path of blades 52 of the reel. The air blast created by blades 52 also tends to pack leaves and so forth into the housing with considerable tightness, thereby increasing the capacity of the rake over that which would be possible in rakes not using a fan or blower, and over blower type rakes in which the leaf-receiving chamber is not closed.

The housing, when it has become filled, may be emptied easily by removing floor 106 and rear wall 112. This is accomplished by releasing hasps 116 from staples 118, then lifting upwardly on rear wall 12 till cleats 108 and 110 are cleared from tie rod 26, whereupon floor 106 may be moved rearwardly. The bottom and rearward sides of the housing are then open, and the raked material will fall from the housing by gravity. After the floor and rear walls have been assembled in the housing, the rake is again ready for use.

Thus it is apparent that a rotary rake having several advantages has been produced. It is quite simple and economical in construction. It is efficient in operation, and has a large capacity, is convenient to unload, and it is not likely that the teeth will be damaged in operation. It utilizes a fan as well as the usual rake teeth. The fan moves the raked material well away from the reel, thereby permitting the use of a larger receptacle for the material raked.

While I have shown a specific embodiment of my invention, it is apparent that many minor changes of construction and operation could be made without departing from the spirit of the invention.

What I claim as new and desire to protect by Letters Patent is:

1. A rotary rake comprising a housing having an opening formed in the bottom thereof, wheels for supporting said housing for movement over the ground in spaced relation thereabove, a reel carried for rotation in said housing on an axis transverse to the direction of travel of the device, the lower portion of said reel projecting downwardly through said opening into close proximity with the ground, said reel including generally radial fan blades spaced peripherally thereabout and teeth projecting radially outwardly beyond the outer edges of said fan blades, a generally planar scoop disposed rearwardly from said reel and pivoted at its rearward edge to said housing on an axis parallel to said reel, said scoop sloping downwardly and forwardly to a point closely spaced from the ground and adjacent the lower portion of said reel, and means for limiting the pivotal movement of said scoop.

2. A rotary rake comprising a housing having an opening formed in the bottom thereof, wheels for supporting said housing for movement over the ground in spaced relation thereabove, a reel carried for rotation in said housing on an axis transverse to the direction of travel of the device, the lower portion of said reel projecting downwardly through said opening into close proximity with the ground, said reel including generally radial fan blades spaced peripherally thereabout and teeth projecting radially outwardly beyond the outer edges of said fan blades, a generally planar scoop disposed rearwardly from said reel and pivoted at its rearward edge to said housing on an axis parallel to said reel, said scoop sloping downwardly and forwardly to a point closely spaced from the ground and adjacent the lower portion of said reel, the forward edge portion of said scoop being curved slightly upwardly, and means for limiting the pivotal movement of said scoop whereby it cannot enter the orbit of said reel.

3. A rotary rake comprising a housing having an aperture in the bottom thereof adjacent its forward end and screened apertures in the rearward portion thereof and being otherwise closed, and otherwise substantially closed, wheels for supporting said housing in spaced relation above the ground, a reel carried for rotation in said housing on a horizontal axis transverse to the line of travel of the device, the lower portion of the reel projecting downwardly through said bottom aperture into close proximity with the ground, said reel including generally radial fan blades spaced peripherally thereabout and resilient teeth carried by and projecting radially beyond said fan blades, and means for rotating said reel, the entire floor of said housing being removable whereby to dump the contents thereof.

4. A rotary rake comprising a housing having an aperture in the bottom thereof adjacent its forward end and screened apertures in the rearward portions of the side walls thereof and being otherwise closed, bottom and rear walls carried removably by said housing, said housing normally being substantially closed except for said apertures, wheels for supporting said housing in spaced relation above the ground, a reel carried for rotation in said housing on a horizontal axis transverse to the line of travel of the device, the lower portion of the reel extending downwardly through said bottom aperture into close proximity with the ground, said reel including generally radial fan blades spaced peripherally thereabout and teeth resiliently mounted on and extending radially beyond said fan blades, and means for rotating said reel, the entire floor and rear wall of said housing being removable whereby to dump the contents thereof.

ARTIE S. TUCKER.

References Cited in the file of this patent

UNITED STATES PATENTS

| Number | Name | Date |
|---|---|---|
| Re. 23,378 | Reitan | June 12, 1951 |
| 1,039,355 | Boss | Sept. 24, 1912 |
| 1,173,485 | Coldwell | Feb. 29, 1916 |
| 1,507,317 | Laberge | Sept. 2, 1924 |
| 1,899,181 | Carolus | Feb. 28, 1933 |
| 2,158,299 | Oppenheim | May 16, 1939 |
| 2,328,712 | Dowd et al. | Sept. 7, 1943 |
| 2,502,769 | Warnke | Apr. 4, 1950 |
| 2,525,090 | Bott | Oct. 10, 1950 |